3,074,330
PHOTOGRAPHIC CAMERA HAVING AUTOMATIC EXPOSURE SETTING MEANS

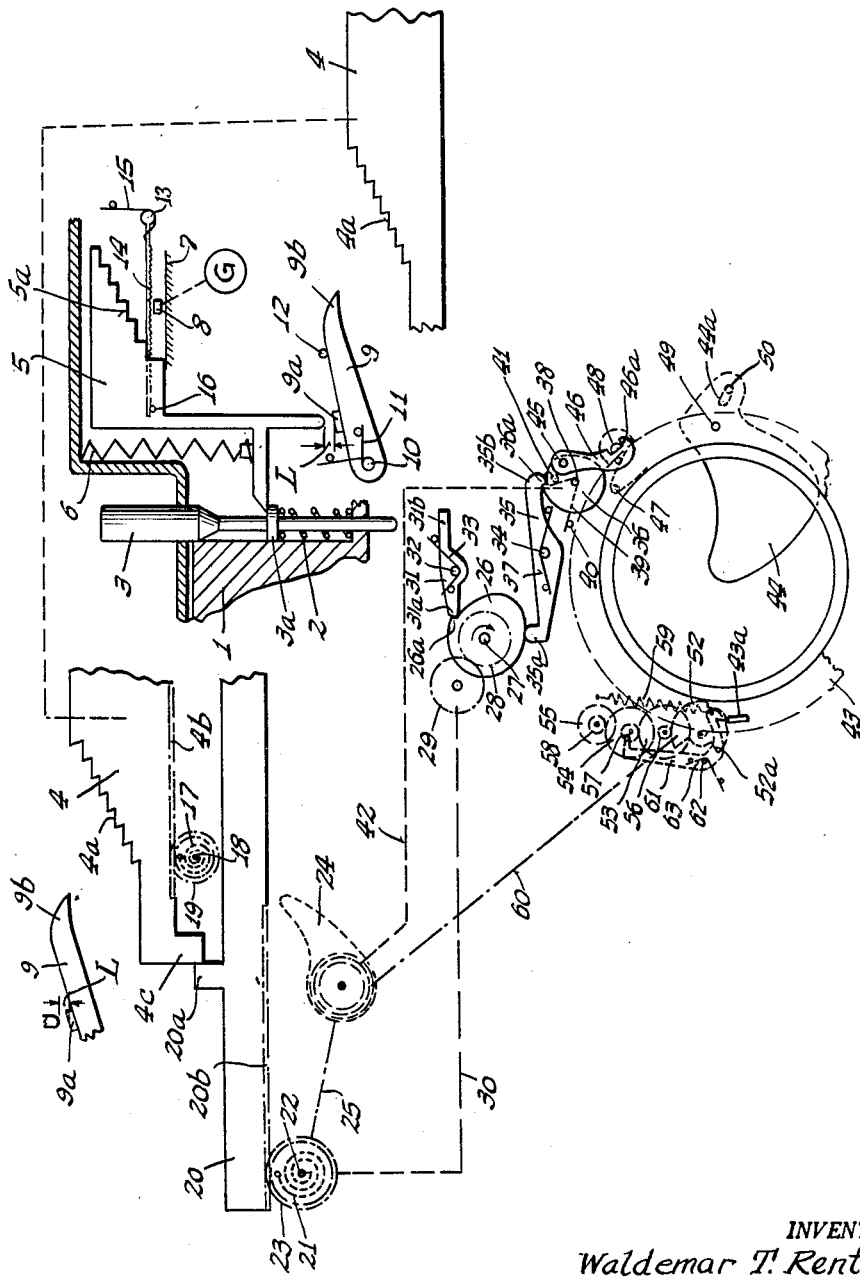

Waldemar T. Rentschler, Calmbach (Enz), Germany, assignor to Alfred Gauthier, G.m.b.H., Calmbach (Enz), Germany, a corporation of Germany
Filed July 13, 1960, Ser. No. 42,608
Claims priority, application Germany July 14, 1959
4 Claims. (Cl. 95—10)

This invention relates to photographic cameras of the type wherein an automatic exposure setting device has a sensing member which is cooperable with an automatically movable exposure setting member for the purpose of adjusting the latter, said sensing member in response to actuation of the camera or shutter release sensing the position of the movable part of a measuring mechanism of an electric exposure meter such as is usually built into the camera.

In cameras of the above type the automatic exposure setting is effected by shifting the sensing member (or a part connected with such member) into the path of movement of the exposure setting member automatically as a consequence of actuation of the camera or shutter release. The organization is such that the sensing member stops the movement of the exposure setting member in a predetermined position which corresponds to the prevailing light conditions and also to the setting of any additional exposure factors. The return of the sensing member to its starting position is effected in response to return movement of the camera or shutter release button or member. Such return movement lifts or shifts out of engagement, in prior known arrangements, the stop for the exposure setting member so that the latter may be shifted to an end position under the action of its driving or biasing means. This mode of operation has the effect that the proper or correct exposure setting exists only during that time for which the camera release or shutter release is held in its depressed position. This has the result that certain kinds of exposures, especially exposures characterized by long intervals of time and also exposures involving a delayed action device, can only be carried out with the greatest attention on the part of the operator, if indeed such exposures may be effected at all.

In order to avoid this disadvantage in prior cameras of this type, there have been proposed in the past various locking or detent devices, by means of which the camera or shutter release button is maintained in its depressed position until the running down movement of the shutter has been completed or else until the transporting or advance of the film for the next picture has been effected. However, such locking or detent devices involve a substantial additional expenditure or cost; in addition, they have the undesirable effect that the reading of the light conditions indicated by the exposure meter is not available to the operator immediately after the exposure, but only after the transporting or advance of the film has effected return of the release button and the sensing member to their starting positions. Another disadvantage of these prior cameras resides in the fact that the fixing or clamping of the movable part of the electric measuring mechanism, which part is only released during the transport of the film, nullifies for a considerable length of time the immunity of such part to shock and vibration, which immunity otherwise would be obtained, for example, by an elastic suspension of the movable part of the measuring mechanism.

The above drawbacks and disadvantages of prior cameras of the type outlined are obviated by the present invention, and one object of the invention is to provide a novel and improved camera of the type set forth, wherein the special advantages which are inherent in such camera are preserved while at the same time the listed disadvantages are avoided. The above object is accomplished, in accordance with the invention, by the provision of a novel movable intermediary member such as a lever or slide, which can be uni-laterally or uni-directionally drivingly connected to the sensing member, in the connection between such sensing member and the exposure setting member. The said novel intermediary member is so arranged as to be shiftable in response to the sensing motion of the sensing member into the path of movement of a member which is connected to the exposure setting member and is constituted as a stop for the latter.

By the present invention there is obtained the important advantage, in cameras of the above described kind, that it is possible to carry out exposures of any kind whatsoever, especially exposures involving relatively long exposure intervals and involving the use of delayed action devices, all without requiring the least attention on the part of the operator as regards the manipulation of the release button as well as the exercise of care to avoid jarring, jolting, etc. which might adversely effect the exposure setting device. There is also had the advantage that only a small expenditure or cost is involved in the construction proposed. These advantages result from the provision of the said novel intermediary member which is arranged between the sensing member and the exposure setting member, acting to retain the setting member after its release in a position which is determined by the movable part of the electrical measuring device. Such novel intermediary member is, in turn, kept in its operative position by the exposure setting member. This reciprocal retaining of the intermediary member and the exposure setting member is effected completely independently of the release and return movement of the camera or shutter release button, until the exposure setting member is first returned to its starting position corresponding to the set or cocked state of its driving or biasing device. This arrangement, as provided by the invention, results in maximum reliability and accuracy of the exposure setting when taking photographs of any kind, all without involving substantial additional expenditure or cost. In addition to the foregoing, the release of the movable part of the electrical measuring mechanism of the exposure meter, which is retained by the sensing member, as effected in response to return of the camera or shutter release button makes it possible for the such part to be freed immediately after the photograph has been taken, thereby enabling it to safely absorb vibration or shock without damage while at the same time providing the operator with an indication or reading of the prevailing light conditions.

A further construction as provided by the invention results in a particularly advantageous arrangement of the camera, as regards simplicity of the components and ease of assembly, as well as facilitating adjustment of the mechanism. This further construction involves the provision of a relatively light or weak spring which acts on the novel intermediary member to urge said member in a direction of motion which is opposite to the sensing direction, and by the provision of a fixed stop by which the movement of this intermediary member in said opposite direction is limited.

Such construction makes it possible to effect, in a completely automatic manner, the return of the intermediary member to its starting position during the movement of the exposure setting member into the end position associated with the set or cocked condition of the driving or biasing mechanism. This automatic return of the intermediary member is accomplished without requiring any cooperation from a control device of complicated shape or configuration, which would necessitate an additional expenditure. Furthermore, the arrangement of the fixed or stationary stop as a limiting member for the springurged return movement of the intermediary member enables an intermediate or intervening space to exist between such member and the sensing member, thereby to permit a certain amount of dead travel for the sensing member. This substantially facilitates the assembly of the components as well as the adjusting of the exposure setting mechanism. In addition, the preliminary movement of the sensing member may be utilized to make operative a well-known device which retains the movable part of the electrical measuring mechanism of the exposure meter in its respective setting position prior to impingement thereon of the sensing member, thereby insuring a dependable and accurate sensing.

The invention will now be explained by means of an embodiment which is diagrammatically illustrated in the single FIGURE of the drawings.

In the FIGURE, the housing or case of a photographic camera is indicated by the numeral 1. Fixed to the front side of the housing 1 in the well-known manner (which is not shown) is a photographic intra-lens shutter assemblage of which only the shutter blade driving mechanism 36, 46, 48, 43, 44 is shown for the sake of clarity of illustration. A shutter release button 3 is provided, said button being movable in a direction perpendicular to the axis of the camera against the action of a return spring 2, and being movably carried by the housing 1 for the purpose of releasing the shutter. In addition, in order to automatically set the shutter there is provided a sensing member 5 which cooperates with an exposure setting member 4 of the shutter, the sensing member enabling (in a well-known manner to be described below) the position of the movable part 8 of the electrical measuring mechanism of an electrical exposure meter to be sensed for effecting the exposure setting. Such electrical exposure meter is usually built into the camera, and the sensing action of the sensing member is effected in response to actuation of the shutter release button 3. The exposure setting member may be either a shutter speed setting member, or a diaphragm setting member, or else an exposure value setting member.

The construction of such setting members, as well as their cooperation with corresponding setting or control devices is well known per se, so that they need not be shown in the drawings. For example, speed, diaphragm, and exposure value setting members of various types suitable for use with the present invention are described in copending applications Serial No. 837,910, filed September 3, 1959, and entitled Photographic Camera With Automatic Exposure Setting, now Patent No. 2,993,422, issued July 25, 1961; Serial No. 839,819, filed September 14, 1959, and entitled Photographic Camera, now Patent No. 3,022,714, issued Feb. 27, 1962; and Serial No. 837,710, filed September 2, 1959, and entitled Photographic Camera, now Patent No. 3,029,718, issued Apr. 17, 1962.

The sensing member 5, which may for example be constructed in the form of a slide which has a bearing on a fixed portion or stationary member of the measuring mechanism of the exposure meter is vertically movable in a direction parallel to the movement of the release button 3 as seen in the figure and is acted on by a compression spring 6 which tends to keep it in engagement with a collar 3a of the release button 3. The spring 6 is weaker than the spring 2, so that it may be readily overcome by the latter. To cooperate with the movable member or part 8 of the measuring mechanism, the sensing member 5 comprises a stepped setting edge 5a, with which the movable part 8 of the measuring mechanism G is cooperable and which it engages or abuts. The needle 8 is movable over a fixed table or supporting member 7, and may be clamped against such member in any adjusted position, this being effected under the action of the spring 6 upon actuation of the camera release button 3.

In accordance with the invention, a novel movable intermediary member 9 is provided and arranged in the connection between the sensing member 5 and the exposure setting member 4. The said intermediary member is arranged to be uni-directionally drivingly connected to the sensing member 5 and is movable into the path of movement of a member connected to the exposure setting member 4, this occurring in response to the downward sensing movement of the member 5. The said intermediary member 9 is constituted as a stop, for halting the member which is connected to the exposure setting member 4.

The intermediary member 9 is indicated as a lever, in the illustrated embodiment of the invention. The member 9 is positioned about an axis 10 provided in the camera housing or in the intra-lens shutter assemblage of the camera, and is normally biased in a counterclockwise direction by a spring 11 and maintained in engagement with a fixed stop pin 12. For the purpose of cooperating with the sensing member 5, the member or lever 9 has a lug 9a, which is located in the path of movement of the sensing member 5.

For the purpose of halting the setting member 4 in its various adjusted positions, the said member is provided with a stepped setting edge 4a, the individual steps of which are correlated with exposure values within the operating range of the shutter. The lever 9 cooperates with the stepped edge 4a in such a manner that, in the course of the setting movement of the exposure setting member which occurs under the action of a driving or biasing device to be described below, one of the steps 4a engages the pointed end 9b of the lever, thereby to halt the setting member in a predetermined adjusted position. The magnitude of the rotary movement of the lever 9 is controlled by the extent of movement of the sensing member 5, and due to the abutting uni-directional engagement between the setting member 4 and the lever 9 the latter automatically maintains its adjusted position as determined basically by the measuring mechanism needle 8 (through the sensing member 5) even after return of the release button 3 and return of the sensing member 5 to their starting positions shown in the figure. Only when the setting or cocking of the driving device which is associated with the setting member 4 has caused the latter to disengage the lever 9 will such lever, under the influence of the return spring 11, swing counterclockwise to its initial starting position as shown in the figure, wherein it engages the fixed stop pin 12.

In order additionally to insure the maintaining of the lever 9 in its adjusted position by engagement with the setting member 4, the teeth or steps 4a of the latter are undercut in the manner shown in the figure. This construction insures continued engagement of the lever 9 with the setting member 4 even when the camera is subjected to strong vibrations or shocks, and in consequence there is avoided a running-down of the exposure setting member 4 and simultaneous wearing or scratching of the lever 9 by engagement with the steps 4a. In consequence an optimal working operation of the lever and the stepped edge 4a, free from wear and tear, is insured.

The invention further provides an organization in the form of a safety device which serves the purpose of preventing the needle 8 of the measuring mechanism from moving or jumping away when the steps 5a of the sensing member 5 engage the said needle. This organization comprises a light lever 14 which is positioned on the camera about an axis 13 and which, for the starting position of the sensing member 5 as shown in the figure, engages a pin 16 provided on the sensing member under the action of a spring 15. For such position, the needle 8 is freely movable over the table member 7. However, when the release button 3 is actuated or depressed, setting into operation the automatic setting mechanism, the lever 14 is first released and its ribbed side engages the needle 8, pressing the same against the fixed stop or table member 7. This action is completed before the sensing member 5 engages the lug 9a of the lever 9, for which purpose the sensing member accordingly has a dead or free travel indicated by the letter L in the figure.

As already stated, the setting member 4 is associated with a driving device or biasing mechanism by means of which it is automatically moved or shifted. The said driving device is shown diagrammatically in the figure, and comprises a spiral spring 17 having one end secured to the fixed shaft 18 of a gear 19 whereas the other end is connetced to the gear 19. The gear 19 meshes with rack teeth 4b provided on the exposure setting member 4.

The driving mechanism is set or cocked in response to actuation of the film transport mechanism of the camera, by means of a cocking member 20 cooperating with the exposure setting member 4. To effect such cooperation, the cocking member 20 and the exposure setting member 4 are provided respectively with cooperable arms 20a and 4c, the said arms forming a uni-directional driving connection to the setting member 4, which is operative for the purpose of cocking or setting the said member.

Both the exposure setting member 4 and the cocking member 20 are shown as longitudinally displaceable, slide-like structures in the figure, for the purpose of producing a simple and easily understandable drawing and comprehension of the invention. However, this representation is in no way to be construed as a limitation with respect to the construction of the members in question. On the contrary, when the invention is put into effect on a specific camera, the said members may be constructed in any suitable manner, as for example in the form of slides, rings or disks.

The cocking member 20 is engaged by another driving device cooperable with a shutter release mechanism to be described below. This other driving device comprises a driving spring 21 and a gear 23 connected to the spring, positioned about an axis 22 and meshing with gear teeth 20b provided on the cocking member 20. The driving device 21, 22, 23 is set or cocked in response to operation of the film transport mechanism, by means of a gear drive or transmission (indicated by the broken line 25) which connects the gear 23 and a film transport lever 24.

The shutter release device which is operable by means of the driving device 21, 22, 23 comprises a cam disk 26 which is positioned about an axis 27 and is connected to the driving device 21, 22, 23 by means of gears 28, 29 as well as by other transmission means indicated diagrammatically by the broken line 30. In order to retain the cam disk 26 as well as the setting member 20 and the exposure setting member 4 in their positions associated with the cocked condition of the driving devices 17, 18, 19 and 21, 22, 23 respectively, an arresting lever 31 is provided, cooperating with the cam disk 26. The lever 31 is positioned about an axis 32 on the camera or in the intra-lens shutter assemblage, and is acted on by a spring 33 which biases it in a counterclockwise direction. When the members 4, 20 and 26 are cocked, a projection 26a provided on the disk 26 engages one arm 31a of the lever 31, and the other arm 31b of the lever 31 is disposed in the path of movement of the release button 3 as shown in the figure.

The cam disk 26 serves to control an arresting lever 35 positioned about an axis 34 and provided for a well-known main drive disk 36 of the shutter. One arm 35a of the arresting lever 35 engages the outer circumference of the cam disk 26 under the action of a spring 37, whereas the other arm 35b of the lever cooperates with the projection 36a provided on the driving disk 36, for the purpose of retaining the latter in its cocked position. The driving disk 36 is positioned in the shutter about an axis 38 and is influenced by a driving spring 39. The spring 39 at one end engages a fixed pin 40 while the other end engages a pin 41 provided on the driving disk. The cocking of the driving disk 36 is also effected in response to operation of the film transport mechanism. A transmission or gear drive indicated by the dotted line 42 connects the driving disk 36 with the film transport level 24, as indicated in the figure.

In addition, there is provided the usual driving pawl or link 46 which is pivotally mounted in a well-known manner about an axis or pin 45 on the driving disk 36 for the purpose of actuating a shutter driving ring 43 provided for the shutter blades 44. By means of a notch 46a provided in the link 46 the latter has driving engagement with a semi-circular pin 48 carried by the shutter driving ring 43. The link 46 is maintained in engagement with the pin 48, retaining the latter in the notch 46a, by the provision of a spring 47 which biases the link in an upward direction as seen in the figure. As is well known in the camera art, the camera disk 36 and the link 46 impart a reciprocating motion to the shutter blade driving ring 43 when the disk 36 runs down in a clockwise direction, whereby the shutter blades 44 are first opened and then closed (upon a fully-open position having been reached). The shutter blades 44 are positioned on the driving ring 43 by means of pins 49, and are in addition provided with slots 44a receiving fixed pins 50, all in the well-known manner.

In order to insure the proper effecting of an automatic setting of the exposure setting member 4 prior to opening of the shutter blades, a delaying mechanism is arranged, which is releasable in response to actuation of the camera or shutter release 3 and which delays the start of opening of the shutter blades by a certain period of time with respect to the actuation or depressing of the release button 3. The said delay period is so selected that, within such time the setting member 4 which is controlled by the exposure meter may travel the maximum extent of movement, and that vibration and impact forces in the camera or shutter, as possibly caused by running down of the same, have ceased.

The delayed action mechanism of the camera, in the illustrated embodiment thereof, comprises gears 52, 53, 54, 55 and pinions 56, 57, 58 which mesh in the manner shown in the drawings. A driving spring 59 is attached to the gear 52 and is stressed in response to advance of the film by actuation of the film transport mechanism, this being accomplished by means of a gear connection arranged between the gear 52 and the film transport lever 24, such gear connection being indicated by the dot-and-dash line 60. Or, in a well-known manner, a driving connection may be established between the members 36 and 52 for this purpose. The delayed action mechanism is maintained in this cocked position by means of a toothed arresting lever 61, which lever is positioned about an axis 62 and meshes with the pinion 57 under the action of a spring 63. The arresting lever 61 has one arm disposed in the path of movement of a lug 43a provided on the shutter blade driving ring 43, said lever being pivoted by the lug after the shutter has been released and the ring actuated, and such pivoting action moving the lever out of engagement with the pinion 57 to enable release and running-down movement of the delayed action mechanism to take place. The release of the delayed action mechanism is effected before the shutter blades 44 start to open; subsequently the lug 43a of the shutter blade driving ring 43 strikes a control surface or blocking portion on the wheel 52. The shutter blades, however, are still in closed position. The delayed action mechanism now runs down to a predetermined extent until an opening or notch 52a of the gear 52 reaches and provides clearance for the lug 43a; that is, until the blocking portion of the gear 52 has been shifted out of the path of movement of the lug 43a. When this has occurred the shutter blade driving ring 43 is able to continue its running down movement under the action of the driving spring 39, and in so doing it opens and thereafter closes the shutter blades 44.

The above described organization operates in the following manner:

If the mechanism is in the set or cocked position as shown in the FIGURE, the taking of a photograph merely requires depressing of the release button 3. This depressing movement of the release button is followed by a lowering movement of the sensing member 5 under the action of its spring 6, during which action the measuring mechanism needle 8 is first clamped against the table member 7 by means of the lever 14. The sensing member 5 then comes into engagement with the lever 9 and pivots the same against the action of the spring 11 to an extent as determined by engagement between one of the steps 5a of the sensing member and the measuring mechanism needle 8, such engagement terminating the movement of the sensing member downward. At the same time the release button 3 at its lower end engages the arresting lever 31 and swings the latter clockwise, effecting disengagement of the lever with the cam disk 26. The exposure setting member 4, the cocking member 20 and the cam disk 26 are thereby released and permitted to run down, the cam 26 releasing the shutter by means of the lever 35. After such release has been effected, the delayed action mechanism becomes operative in the above described manner and prevents an immediate opening of the shutter blades 44.

One of the steps 4a of the exposure setting member 4 which is also running down or shifting, engages after a longer or shorter extent of movement, the tip 9b of the lever 9. Each of the steps 4a is associated with a specific exposure value which is set on either a shutter speed escapement mechanism or a diaphragm setting mechanism in a manner known per se, by means of the setting member 4. When the exposure setting member 4 strikes the lever 9, the automatic exposure setting is terminated or completed. Owing to the aforementioned cooperation of the lever 9 with the stepped edge 4a, the said setting is maintained even after the shutter release button 3 returns, together with the sensing member 5, to their starting positions as shown in the FIGURE.

I claim:

1. In a photographic camera of the type provided with an automatic setting means including a light intensity measuring device having a movable part and a movable sensing holding device for securing said part in different adjusted positions in response to actuation of the camera shutter release, and including an exposure setting member having a powered drive means, the improvement which comprises a movable intermediary member for predeterminately controlling the exposure setting member in response to adjustable positioning of the holding device; a unidirectionally acting driving connection between the holding device and the intermediary member for adjustably positioning the latter into operable engagement with said exposure setting member in response to sensing movement of the holding device; and cooperable abuttable stop means on the intermediary member and the exposure setting member for effecting an adjustable limiting position of the latter in accordance with the different adjusted positions of the intermediary member as effected by the holding device, said cooperable abuttable stop means having interengageable retaining means so that in the operative position of said intermediary member the interengageable retaining means retain said exposure setting member in adjusted position upon the release of said shutter release and whereby the release of said shutter release permits the movable part of the light intensity measuring device to be freed.

2. A photographic camera as in claim 1, in which there is a spring acting on the intermediary member and biasing the same in a direction opposite to that in which it is shifted by the holding device, and in which there is a fixed stop limiting the spring-effected movement of the intermediary member.

3. In combination, a photographic camera comprising a light intensity measuring device including a movable part and a cooperating movable sensing holding device, a shutter release operatively associated with said holding device whereby the latter is rendered operative upon actuation of said shutter release for securing said movable part in different adjusted positions; an adjustable exposure setting member including means for driving said setting member; a separate and distinct movable intermediary member operatively disposed between said holding device and said exposure setting member for predeterminately controlling the adjustment of said setting member in response to adjustably positioning said holding device, a unidirectional driving connection between said holding device and the intermediary member for adjustably positioning the latter into operable engagement with said exposure setting member in response to the movement of said holding device, said driving connection imparting a predeterminate amount of free motion to said holding device prior to its actuation of said intermediary member, and cooperable interengageable stop means on said intermediary member and said exposure setting member for limiting the latter in accordance with the different adjusted positions of the interemdiary member as effected by said holding device, and said cooperable stop means functioning to retain said intermediary member and exposure member in their respective adjusted positions upon release of said shutter release.

4. The invention as defined in claim 3 wherein said intermediary member comprises a lever, means for pivoting said lever, and said interengageable stop means including a retaining lug on the end of said lever and a cooperating retaining step on said setting member.

References Cited in the file of this patent

UNITED STATES PATENTS

| | | |
|---|---|---|
| 2,930,282 | Herterich | Mar. 29, 1960 |
| 2,940,046 | Herterich | June 7, 1960 |
| 2,990,758 | Sauer | July 4, 1961 |